(12) United States Patent
Guise

(10) Patent No.: US 10,475,027 B2
(45) Date of Patent: Nov. 12, 2019

(54) SYSTEM AND METHOD FOR EXCHANGING DATA WITH SMART CARDS

(71) Applicant: Capital One Financial Corporation, McLean, VA (US)

(72) Inventor: Matthew T. Guise, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 770 days.

(21) Appl. No.: 14/338,423

(22) Filed: Jul. 23, 2014

(65) Prior Publication Data

US 2015/0032635 A1 Jan. 29, 2015

Related U.S. Application Data

(60) Provisional application No. 61/857,443, filed on Jul. 23, 2013.

(51) Int. Cl.
*G06F 21/44* (2013.01)
*G06Q 20/34* (2012.01)
*G06Q 20/10* (2012.01)
*G06Q 20/40* (2012.01)

(52) U.S. Cl.
CPC ......... *G06Q 20/356* (2013.01); *G06Q 20/105* (2013.01); *G06Q 20/409* (2013.01); *G06Q 20/4012* (2013.01); *G06Q 20/40145* (2013.01)

(58) Field of Classification Search
CPC .................. G06F 21/44; G06Q 20/00–425
See application file for complete search history.

(56) References Cited

U.S. PATENT DOCUMENTS

| | | | | |
|---|---|---|---|---|
| 8,285,329 B1 * | 10/2012 | Zhu | ............ | G06F 21/629 235/380 |
| 8,700,729 B2 * | 4/2014 | Dua | ............ | G06Q 20/20 705/64 |
| 2005/0156026 A1 * | 7/2005 | Ghosh | .......... | G06Q 20/045 235/380 |
| 2008/0070495 A1 * | 3/2008 | Stricklen | ........ | H04W 8/22 455/3.01 |
| 2011/0078081 A1 * | 3/2011 | Pirzadeh | ........ | G06Q 20/20 705/44 |

* cited by examiner

*Primary Examiner* — Calvin L Hewitt, II
*Assistant Examiner* — Zehra Raza
(74) *Attorney, Agent, or Firm* — Troutman Sanders LLP; Christopher J. Forstner; John A. Morrissett

(57) ABSTRACT

A system that includes an issuer system that receives, via a network, registration information from a mobile device, wherein the issuer system is associated with a financial institution that issues a smart card to a user and wherein the registration information includes an identifier of the mobile device, and a mobile device application associated with the issuer system, that when executed on a mobile device, communicates with the issuer system to validate the mobile device as a trusted device and enables the trusted device to communicate with the smart card and enable smart card management features mobile device application.

6 Claims, 7 Drawing Sheets

100

SYSTEM AND METHOD FOR EXCHANGING DATA WITH SMART CARDS

CROSS-REFERENCE TO RELATED APPLICATIONS

This application contains subject matter related to and claims the benefit of U.S. Provisional Patent Application No. 61/857,443, filed on Jul. 23, 2013, the entire contents of which is incorporated herein by reference.

FIELD OF THE DISCLOSURE

The present disclosure relates to systems and methods for exchanging data between mobile devices and smart cards.

BACKGROUND OF THE DISCLOSURE

Currently, a user having a smart card is dependent on physical locations of smart card-accepting devices in order to read/write data onto the smart card. This can be frustrating for smart card cardholders, as they are limited as to where they can go to change the settings on their smart cards.

These and other drawbacks exist.

SUMMARY OF THE DISCLOSURE

Various example embodiment provide a system including an issuer system that receives, via a network, registration information from a mobile device, wherein the issuer system is associated with a financial institution that issues a smart card to a user and wherein the registration information includes an identifier of the mobile device and a mobile device application associated with the issuer system, that when executed on a mobile device, communicates with the issuer system to validate the mobile device as a trusted device and enables the trusted device to communicate with the smart card and enable smart card management features mobile device application.

In various embodiments, the trusted device communicates with the smart card via near-field communications (NFC). Also, the smart card is an integrated circuit card and/or a Europay, MasterCard and Visa card. The management features include enabling offline updates to a personal identification number (PIN) of the smart card.

Various embodiments also provide a system including an issuer system that receives via a network from a mobile device an inputted personal identification number (PIN) associated with a smart card issued by the issuer system and transmits via a communication interface a validation message including the inputted PIN to the mobile device based on a validation of the inputted PIN, and a mobile application executing on a mobile device that receives the validation message, prompts the user to provide the inputted PIN to the mobile device, compares, using a processor of the mobile device, the provided inputted PIN with the inputted PIN received in the validation message, and enables transmission of the inputted PIN to the smart card if the provided inputted PIN matches the inputted PIN received in the validation message.

Various embodiments also provide a system including an issuer system that receives an authorization request for a transaction initiated by a user and transmits a verification request to a mobile application on a mobile device of the user, wherein the issuer system receives the authorization request from a merchant via an authorization network and wherein the issuer system transmits the verification request to the mobile application via a network, and a mobile application on a mobile device of the user that receives the verification request, prompts the user to input a personal identifier, receives an inputted personal identifier, and communicates with a smart card of the user to verify the inputted personal identifier. The personal identifier is a personal identification number (PIN) and the inputted personal identifier is an inputted PIN Also, the mobile device includes a biometric data reader that interfaces with the mobile application, and wherein the personal identifier includes biometric data and the inputted personal identifier includes inputted biometric data. To verify the inputted personal identifier, the mobile application receives the personal identifier from the smart card and compares the received personal identifier to the inputted personal identifier to determine whether the received and inputted personal identifiers match. When there is a match, the issuer system receives, via the network, a verification message and authorizes the transaction based on the received verification message.

In various embodiments, the authorization network and the network are the same authorization network.

Also, the issuer system transmits, via the authorization network, an authorization to a merchant associated with the transaction.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific exemplary embodiments and details involving systems and methods for providing read/write capabilities to a smart card by way of a secured application on a mobile device. It should be appreciated, however, that the present disclosure is not limited to these specific embodiments and details, which are exemplary only.

It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only.

Figure 1:
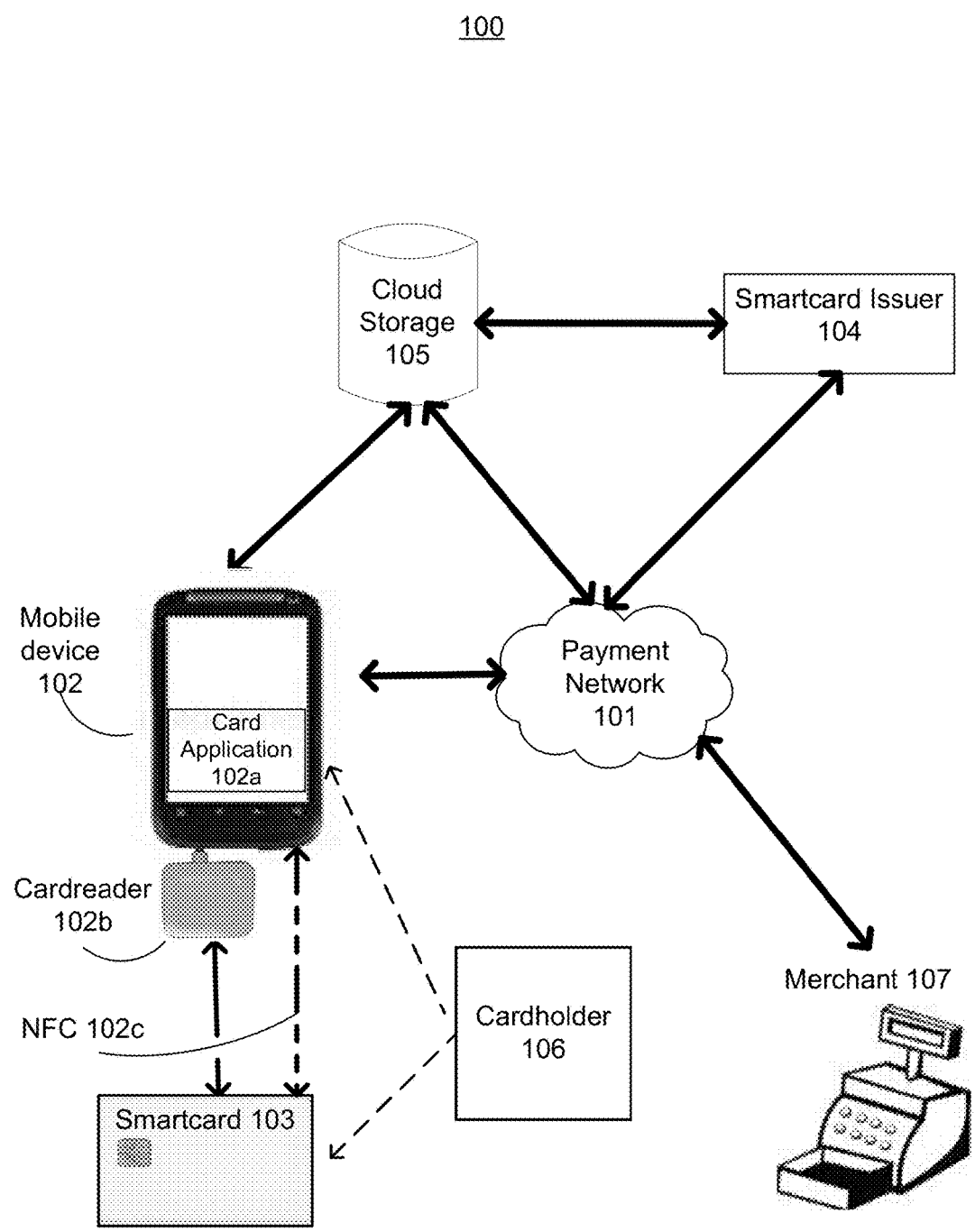
FIG. 1 depicts a schematic diagram of a system for enabling read/write capability to a smart card by way of a mobile application on a mobile device, according to an exemplary embodiment of the disclosure.

FIG. 1 depicts an exemplary embodiment of a system 100 for providing read/write interfaces between a smart card and a mobile device by way of a secured application on a mobile device, according to various embodiments of the disclosure. The system may include various network-enabled computer systems, including, as depicted in FIG. 1 for example, a card issuer 104, cloud storage 105, a payment network 101, and a merchant 107. It is also noted that the system 100 illustrates only a single instance of each component. It will be appreciated that multiple instances of these components may be used. Moreover, the system 100 may include other devices not depicted in FIG. 1.

Other exemplary embodiments may disclose card issuer 104 and/or cloud storage 105 as being integrated into payment network 101 or merchant 107. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the creation and provisioning of account services to mobile device 102 for use by cardholder 106.

The components depicted in FIG. 1 may store information in various electronic storage media. Electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIG. 1 may be coupled via one or more networks, such as, for example, payment network 101. Payment network 101 may be used by one or more financial institutions and other entities to securely transmit data, such as data related to digital financial transactions. Payment network 101 may be one or more of a wireless network, a wired network or any combination of wireless network and wired network. For example, network 101 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal. Network 101 may comprise one or more secure communication channels for securely exchanging information between mobile device 102, merchant 107, and/or card issuer 104.

In addition, network 101 may include, without limitation, telephone lines, fiber optics, IEEE Ethernet 902.3, a wide area network ("WAN"), a local area network ("LAN"), or a global network such as the Internet. Also network 101 may support an Internet network, a wireless communication network, a cellular network, or the like, or any combination thereof. Network 101 may further include one network, or any number of the exemplary types of networks mentioned above, operating as a stand-alone network or in cooperation with each other. Network 101 may utilize one or more protocols of one or more network elements to which they are communicatively coupled. Network 101 may translate to or from other protocols to one or more protocols of network devices. Although network 101 is depicted as a single network, it should be appreciated that according to one or more embodiments, network 101 may comprise a plurality of interconnected networks, such as, for example, the Internet, a service provider's network, a cable television network, corporate networks, and home networks.

Cloud storage 105 may be a virtualized data storage pool hosted by one or more third parties, card issuer 104, payment network 101, and/or merchant 107. Cloud storage 105 may comprise one or more distributed servers and may be used to store data objects for access by mobile device 102, card issuer 104, and/or payment network 101. Cloud storage 105 may be accessed through a web service application programming interface (API), a cloud storage gateway or through a web-based user interface. Cloud storage 105 may communicate data with issuer 104 and mobile device 102 using one or more networks. The networks may be different from payment network 101. The networks may be secured. The networks may be wireless.

Smart card 103 may be any pocket-sized card with one or more embedded integrated circuits (IC). Smart cards may also be referred to as IC cards or chip cards. Smart card 103 may be made of plastic and may provide identification, authentication, data storage and application processing. Smart card 103 may exchange data, such as payment data, with merchant terminals or smart card-capable automatic teller machines (ATMs). Europay, Visa, and Mastercard (EMV) have developed standards that define the interaction at the physical, electrical, data and application levels between smart cards and smart card processing devices for financial transactions. There are standards based on ISO/IEC 7816 for contact cards, and standards based on ISO/IEC 14443 for contactless cards, which are both incorporated herein by reference.

Smart card 103 may be associated with one or more cardholders, such as cardholder 106. Smart card 103 may have been previously provided to cardholder 106 by issuer 104. Smart card 103 may store one or more units of exchange to allow cardholder 106 to purchase goods or services and have the value of the purchase deducted from a balance on smart card 103. Smart card 103 may store one or more offline PINs associated with cardholder 106. Before reading or writing data to the smart card at a smart card terminal, the cardholder 106 must first enter the offline PIN on a keypad or touchscreen associated with the terminal. Smartcard 103 may store biometric data associated with cardholder 106, such as fingerprint data. Cardholder 106 may use smartcard 103 to pay for goods and services. Smartcard 103 may store account information for cardholder 106. Smart card 103 may be associated with one or more account numbers for accounts maintained by issuer 104, merchant 107, or by a third party entity.

In various exemplary embodiments, cardholder 106 may be any individual or entity that desires to conduct a financial transaction using smart card 103. Also, a cardholder may be a computer system associated with or operated by such an individual or entity.

Card issuer 104 may be a financial institution. A financial institution may be, for example, a bank, other type of financial institution, including a credit card provider, for example, or any other entity that offers accounts to customers. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, an account or service that links to an underlying payment account already described, or mobile commerce account. An account may or may not have an associated card, such as, for example, a credit card for a credit account or a debit card for a debit account. The account may enable payment using biometric authentication, or contactless based forms of authentication, such as QR codes or near-field communications. The account card may be associated or affiliated with one or more social networking sites, such as a co-branded credit card.

Issuer 104 may store data related to cardholder 106 and smartcard 103. Issuer 104 may store the offline PIN for smart card 103, the name, address, email address, phone number, a username, password, biometric information, and other data that uniquely identifies cardholder 106. Card issuer 104 may store an online PIN for smart card 103. The online PIN may be the same as the offline PIN. The online PIN may be different from the offline PIN in order to add an additional layer of security and fraud prevention.

Cardholder 106 may have one or more mobile devices, such as mobile device 102. Mobile device 102 may be, for example, a handheld PC, a phone, a smartphone, a PDA, a tablet computer, or other device. Mobile device 102 may include Near Field Communication (NFC) capabilities 102c, which may allow for communication with other devices by touching them together or bringing them into close proximity. Exemplary NFC standards include ISO/IEC 18092: 2004, which defines communication modes for Near Field Communication Interface and Protocol (NFCIP-1). For example, mobile device 102 may be configured using the Isis Mobile Wallet™ system, which is incorporated herein by reference. Other exemplary NFC standards include those created by the NFC Forum.

Mobile device 102 may include one or more software applications, such as card application 102a. Card application 102a may be a software application that enables mobile device 102 to securely exchange data with smart card 103, payment network 101, cloud storage 105, merchant 107, and/or card issuer 104. Card application 102a may provide one or more graphical user interfaces for cardholder 106 to pay for goods and services using smart card 103, change the offline PIN for smart card 103, submit the offline or online PIN, biometric information, and/or other authorization information to smart card 103, payment network 101, issuer 104, merchant 107, or cloud storage 105. These processes will be described in greater detail in connection with FIGS. 2-4.

Mobile device 102 may be connected to one or more cardreaders 102b. Cardreader 102b may be a hardware device that is configured to read data from smart card 103 and write data to smart card 103. Cardholder 106 may use card application 102a in conjunction with cardreader 102b to read data from smart card 103 and write data to smart card 103. Mobile device 102 may also use NFC 102c for wireless or contactless data exchange with smartcard 103.

Cardholder 106 may use mobile device 102 in conjunction with smart card 103 to purchase goods or services from merchant 107. Merchant 107 may be a physical point of sale location. Merchant 107 may be an online retailer of goods or services. Smart card 103 may exchange payment information directly with one or more smart card terminals associated with merchant 107. Smart card 103 may exchange payment information with merchant 107 through card application 102a on mobile device 102, and/or through payment network 101. This process will be described in greater detail in connection with FIGS. 2-4.

Figure 5:
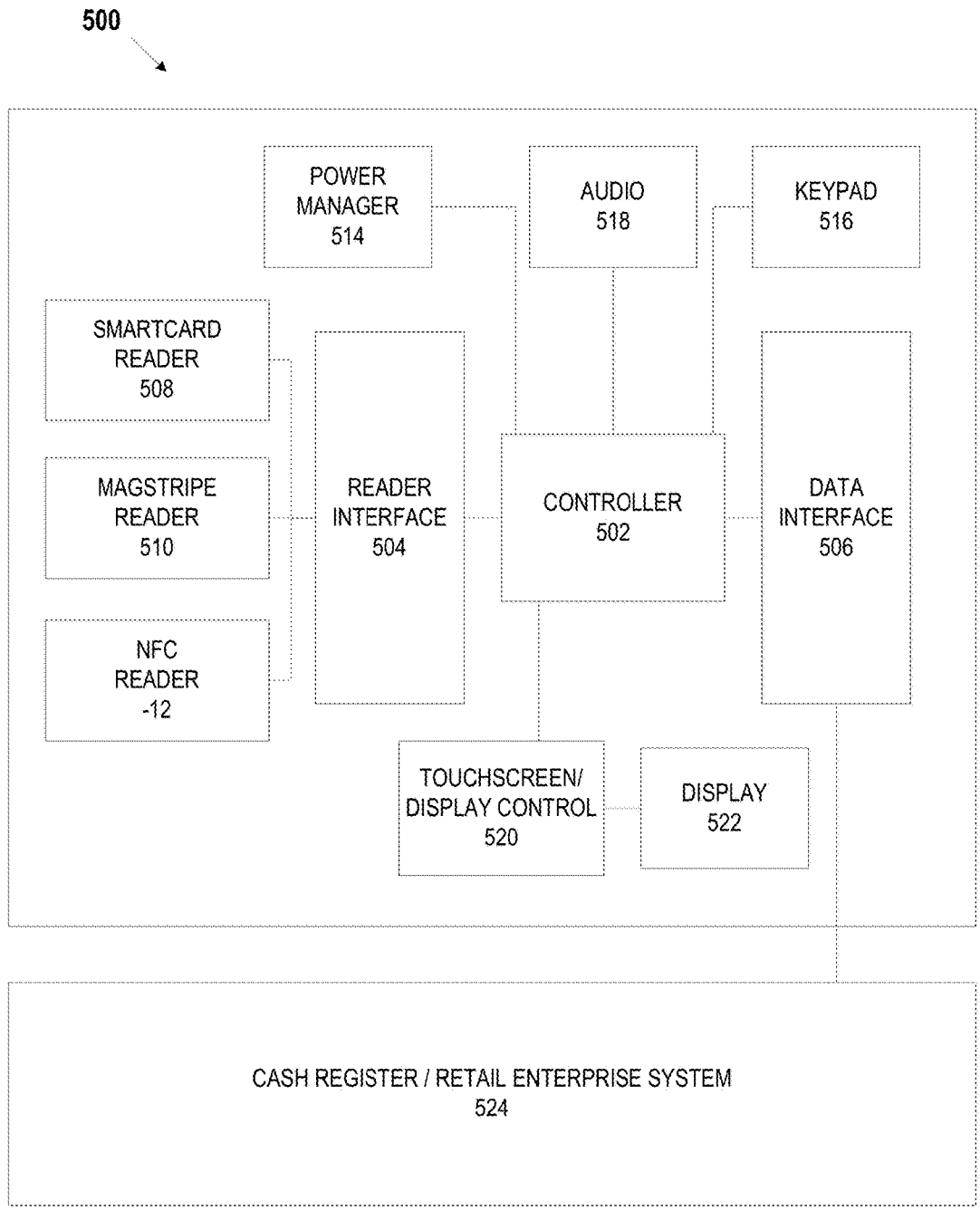
FIG. 5 depicts an example point of sale system according to an embodiment of the disclosure.

FIG. 5 depicts an example Point of Sale (PoS) device 500. PoS device 500 may provide the interface at what a customer or end user makes a payment to the merchant in exchange for goods or services. PoS device 500 may include and/or cooperate with weighing scales, scanners, electronic and manual cash registers, electronic funds transfer at point of sale (EFTPOS) terminals, touch screens and any other wide variety of hardware and software available for use with PoS device 500. PoS device 500 may be a retail point of sale system and may include a cash register and/or cash register-like computer components to enable purchase transactions. PoS device 500 also may be a hospitality point of sale system and include computerized systems incorporating registers, computers and peripheral equipment, usually on a computer network to be used in restaurant, hair salons, hotels or the like. PoS device 500 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 500 also may be a cloud-based point of sale system that can be deployed as software as a service, which can be accessed directly from the Internet using, for example, an Internet browser.

Referring to FIG. 5, an example PoS device 500 is shown. PoS device 500 may include a controller 502, a reader interface 504, a data interface 506, a smartcard reader 508, a magnetic stripe reader 510, a near-field communications (NFC) reader 512, a power manager 514, a keypad 516, an audio interface 518, a touchscreen/display controller 520, and a display 522. Also, PoS device 500 may be coupled with, integrated into or otherwise connected with a cash register/retail enterprise system 524.

In various embodiments, Controller 502 may be any controller or processor capable of controlling the operations of PoS device 500. For example, controller 502 may be a Intel® 2nd Generation Core™ i3 or i5 or Pentium™ G850 processor or the like. Controller 502 also may be a controller included in a personal computer, smartphone device, tablet PC or the like.

Reader interface 504 may provide an interface between the various reader devices associated with PoS device 500 and PoS device 500. For example, reader interface 504 may provide an interface between smartcard reader 508, magnetic stripe reader 510, NFC reader 512 and controller 502. In various embodiments, reader interface 504 may be a wired interface such as a USB, RS232 or RS485 interface and the like. Reader interface 504 also may be a wireless interface and implement technologies such as Bluetooth, the 802.11(x) wireless specifications and the like. Reader interface 504 may enable communication of information read by the various reader devices from the various reader devices to PoS device 500 to enable transactions. For example, reader interface 504 may enable communication of a credit or debit card number read by a reader device from that device to PoS device 500. In various embodiments, reader interface 504 may interface between PoS device 500 and other devices that do not necessarily "read" information but instead receive information from other devices.

Data interface 506 may allow PoS device 500 to pass communicate data throughout PoS device and with other devices including, for example, cash register/retail enterprise system 524. Data interface 506 may enable PoS device 500 to integrate with various customer resource management (CRM) and/or enterprise resource management (ERP) systems. Data interface 506 may include hardware, firmware and software that make aspects of data interface 506 a wired interface. Data interface 506 also may include hardware, firmware and software that make aspects of data interface 506 a wireless interface. In various embodiments, data interface 506 also enables communication between PoS device other devices.

Smartcard reader 508 may be any electronic data input device that reads data from a smart card. Smartcard reader 508 may be capable of supplying an integrated circuit on the smart card with electricity and communicating with the smart card via protocols, thereby enabling read and write functions. In various embodiments, smartcard reader 508 may enable reading from contact or contactless smart cards. Smartcard reader 508 also may communicate using standard protocols including ISO/IEC 7816, ISO/IEC 14443 and/or the like or proprietary protocols.

Magnetic stripe reader 510 may be any electronic data input device that reads data from a magnetic stripe on a credit or debit card, for example. In various embodiments, magnetic stripe reader 510 may include a magnetic reading head capable of reading information from a magnetic stripe. Magnetic stripe reader 510 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 512 may be any electronic data input device that reads data from a NFC device. In an exemplary embodiment, NFC reader 512 may enable Industry Standard NFC Payment Transmission. For example, the NFC reader 512 may communicate with a NFC enabled device to enable two loop antennas to form an air-core transformer when placed near one another by using magnetic induction. NFC reader 512 may operate at 13.56 MHz or any other acceptable frequency. Also, NFC reader 512 may enable a passive communication mode, where an initiator device provides a carrier field, permitting answers by the target device via modulation of existing fields. Additionally, NFC reader 512 also may enable an active communication mode by allowing alternate field generation by the initiator and target devices.

In various embodiments, NFC reader 512 may deactivate an RF field while awaiting data. NFC reader 512 may receive communications containing Miller-type coding with varying modulations, including 100% modulation. NFC reader 512 also may receive communications containing Manchester coding with varying modulations, including a modulation ratio of approximately 10%, for example. Additionally, NFC reader 512 may be capable of receiving and transmitting data at the same time, as well as checking for potential collisions when the transmitted signal and received signal frequencies differ.

NFC reader 512 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 512 may be able to utilize transmission protocols and methods that are developed in the future using other frequencies or modes of transmission. NFC reader 512 also may be backwards-compatible with existing payment techniques, such as, for example RFID. Also, NFC reader 512 may support transmission requirements to meet new and evolving payment standards including internet based transmission triggered by NFC. In various embodiments, NFC reader 512 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 514 may be any microcontroller or integrated circuit that governs power functions of PoS device 500. Power manager 514 may include, for example, firmware, software, memory, a CPU, a CPU, input/output functions, timers to measure intervals of time, as well as analog to digital converters to measure the voltages of the main battery or power source of PoS device 500. In various embodiments, Power manager 514 remain active even when PoS device 500 is completely shut down, unused, and/or powered by the backup battery. Power manager 514 may be responsible for coordinating many functions, including, for example, monitoring power connections and battery charges, charging batteries when necessary, controlling power to other integrated circuits within PoS device 500 and/or other peripherals and/or readers, shutting down unnecessary system components when they are left idle, controlling sleep and power functions (on and off), managing the interface for built-in keypad and trackpads, and/or regulating a real-time clock (RTC).

Keypad 516 may any input device that includes a set of buttons arranged, for example, in a block or pad and may bear digits, symbols and/or alphabetical letters. Keypad 516 may be a hardware-based or mechanical-type keypad and/or implemented in software and displayed on, for example, a screen or touch screen to form a keypad. Keypad 516 may receive input from a user that pushed or otherwise activates one or more buttons on keypad 516 to provide input.

Audio interface 518 may be any device capable of providing audio signals from PoS device 500. For example, audio interface may be a speaker or speakers that may produce audio signals. In various embodiments, audio interface 518 may be integrated within PoS device 500. Audio interface 518 also may include components that are external to PoS device 500.

Touchscreen/display control 520 may be any device or controller that contrals an electronic visual display. Touchscreen/display control 520 may allow a user to interact with PoS device 500 through simple or multi-touch gestures by touching a screen or display (e.g., display 522). Touchscreen/display control 520 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 520 may receive inputs from the touchscreen and process the received inputs. Touchscreen/display control 520 also may control the display on PoS device 500, thereby providing the graphical user interface on a display to a user of PoS device 500.

Display 522 may be any display suitable for a PoS device. For example, display 522 may be a TFT, LCD, LED or other display. Display 522 also may be a touchscreen display that for example allows a user to interact with PoS device 500 through simple or multi-touch gestures by touching a screen or display (e.g., display 522). Display 522 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 522 may receive inputs from control gestures provided by a user. Display 522 also may display images, thereby providing the graphical user interface to a user of PoS device 500.

Cash register/retail enterprise system 524 may me any device or devices that cooperate with PoS device 500 to process transactions. Cash register/retail enterprise system 524 may be coupled with other components of PoS device 500 via, for example, a data interface (e.g., data interface 506) as illustrated in FIG. 5. Cash register/retail enterprise system 524 also may be integrated into PoS device 500.

In various embodiments, cash register/retail enterprise system 524 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 524 may comprise an retail enterprise system and/or a customer relationship management system. Retail enterprise system 524 may enable retain enterprises to manage operations and performance across a retail operation. Retail enterprise system 524 may be a stand-alone application in, for example, individual stores, or may be interconnected via a network. Retail enterprise system 524 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 524 also may include inventory control and tracking capabilities, reporting tools, customer management capabilities, employee management tools, and may integrate with other accounting software.

In various embodiments cash register/retail enterprise system 524 may be a hospitality PoS. In such embodiments, retail enterprise system 524 may include hospitality PoS software (e.g, Aloha PoS Restaurant software from NCR®, Micros® RES and Symphony software and the like), hospitality management software, and other hardware and software to facilitate hospitality operations.

Figure 6:
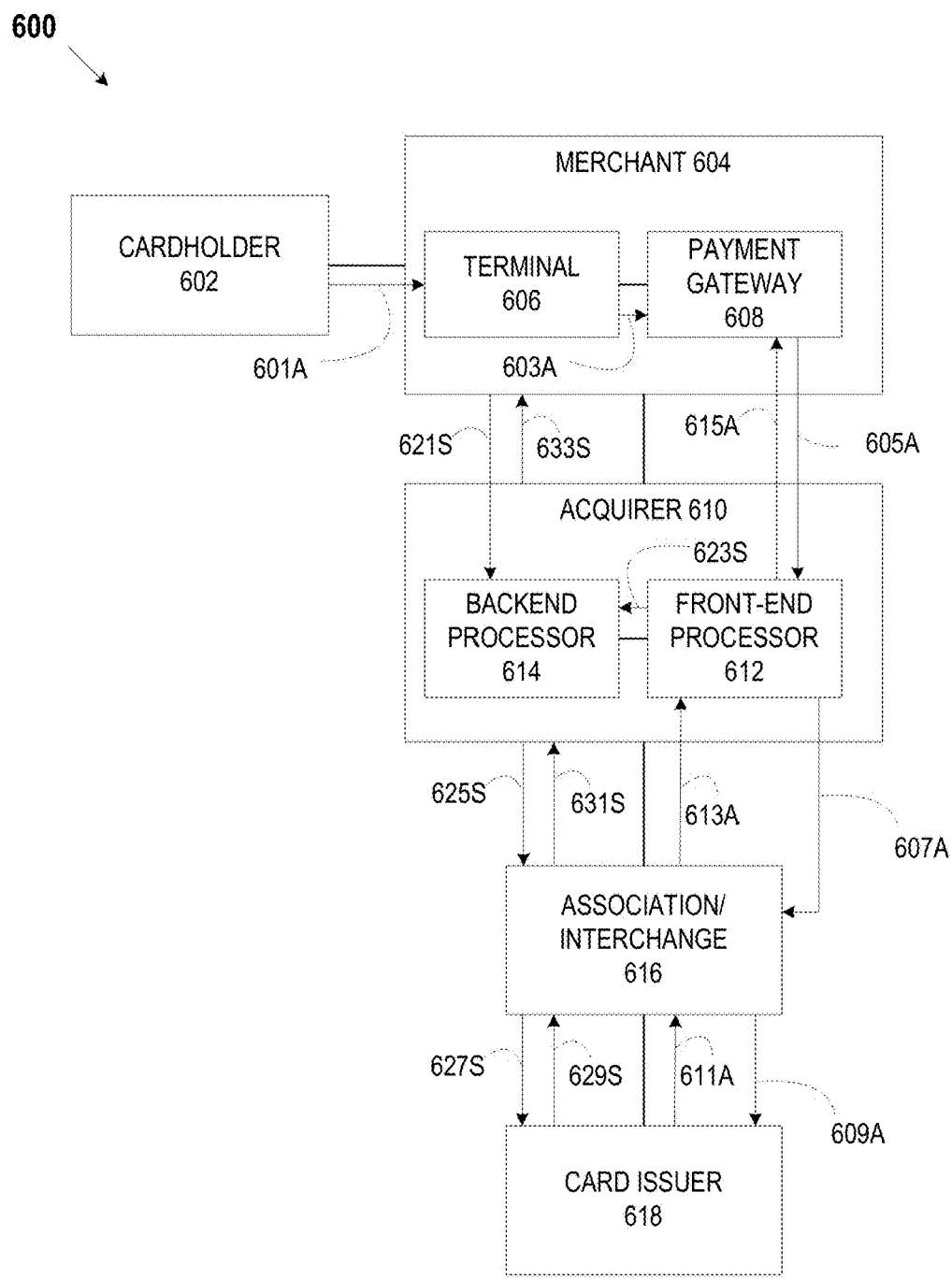
FIG. 6 depicts an example authorization network according to an embodiment of the disclosure.

FIG. 6 illustrates an example system 600 and method for card authorization. As shown and described in FIG. 6, merchants, cardholders and financial institutions may be connected with a card association network to enable secure transactions and timely payments. System 600 may include a cardholder 602, merchant 604, Acquirer 610, Association/Interchange 616, and card issuer 618.

Cardholder 602 may be any card holder, including a credit card holder, debit card holder, stored value card holder and the like. Cardholder 602 may possess a plastic card or carry a device (e.g., a mobile device) that securely stores card credentials and is capable of transmitting the card credentials to, for example, a PoS terminal (e.g., terminal 606). Cardholder 602 may interact with a merchant (e.g., merchant 604) by presenting a card or card credentials to a terminal (e.g., terminal 606).

Merchant 604 may be any merchant that accepts payment from a cardholder, for example. Merchant 604 may be any retailer, service provider, business entity, or individual that accepts payments. Merchant 604 may include software, firmware and hardware for accepting and/or processing payments. For example, as illustrated in FIG. 6, merchant 604 may include a terminal 606 and a payment gateway 608. Terminal 606 and payment gateway 608 may comprise the physical or virtual device(s) used by merchant 604 to communicate information to front-end processor 612 of acquirer 610. Terminal 606 may be similar to PoS system [Y00] as shown and described in Figure Y. In various embodiments, payment gateway 608 may be an e-commerce application service provider service that authorizes payments for merchants. As such, payment gateway 608 may be a virtual equivalent of a PoS terminal and interface with, for example, a billing system of merchant 604 and pass data to front-end processor 612 of acquirer 610.

Acquirer 610 may be, for example, a financial institution or bank, that holds the contract for providing payment processing services to merchant 604. Merchant 604 may have a merchant account that may serve as a contract under which Acquirer 610 may extend a line of credit to a merchant who wishes to accept, for example, credit card transactions. As shown in FIG. 6, Acquirer 610 may be associated with front-end processor 612 and back-end processor 614.

In various examples, front-end processor 612 may be a platform that card terminal 606 and/or payment gateway 608 communicate with when approving a transaction. Front-end processor 612 may include hardware, firmware, and software to process transactions. Front-end processor 612 may be responsible for the authorization and capture portion of credit card transaction. Front-end processor 612 also may include additional front-end platform interconnections to support, for example, ACH and debit transactions.

Backend processor 614 may be a platform that takes captured transactions from front-end processor 612 and settles them through an Interchange system (e.g., association/interchange 616). Back-end processor 614 may generate, for example, daily ACH files for merchant settlement. Back-end processor 614 also may handle chargeback handling, retrieval request and monthly statements.

Association/interchange 616 may be the consumer payment system whose members are the financial institutions that issue payment cards and/or sign merchant to accept payment cards. Example associations/interchanges 616 may include, Visa®, MasterCard®, and AmericanExpress®. Association/interchange 616 may include one or more computer systems and networks to process transactions.

Issuer 618 may be a financial institution that issues payment cards and maintains a contract with cardholders for repayment. In various embodiments, issuer 618 may issue credit, debit, and/or stored value cards, for example. Example issuers may include, Capital One, Bank of America, Citibank, and the like.

In various embodiments, processing a payment card transaction may involves two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 602 may present payment card as payment (601A) at merchant 604 PoS terminal 606, for example. Merchant 604 may enter card into a physical PoS terminal 606 or submit a credit card transaction to a payment gateway 608 on behalf of cardholder 602 via secure connection from a Web site, retail location, or a wireless device.

Payment gateway 608 may receive the secure transaction information (603A) and may pass the secure transaction information (605A) via a secure connection to the merchant acquirer's 610 front-end processor 612.

Front-end processor 612 may submit the transaction (607A) to association/interchange 616 (e.g., a network of financial entities that communicate to manage the processing, clearing and settlement of credit card transactions). Association/interchange 616 may route the transaction (609A) to the customer's Issuer 618. Issuer 618 may approve or decline the transaction and passes the transaction results back (611A) through association/interchange 616. Association/interchange then may relay the transaction results (613A) to front-end processor 612.

Front-end processor 612 may relay the transaction results (615A) back to the payment gateway 608 and/or terminal 606. Payment gateway 608 may store the transaction results and sends them to merchant 604. Merchant 604 may receive the authorization response and complete the transaction accordingly.

During settlement, merchant 604 may deposit the transaction receipt (621S) with acquirer 610 via, for example, a settlement batch. Captured authorizations may be passed (623S) from front-end processor 612 to the back-end processor 614 for settlement. Back-end processor may generates ACH files for merchant settlement. Acquirer may submit settlement files (625S, 627S) to Issuer 618 for reimbursement via association/interchange 616. Issuer 618 may post the transaction and pay merchant 604 (629S, 631S, 633S).

Figure 7:
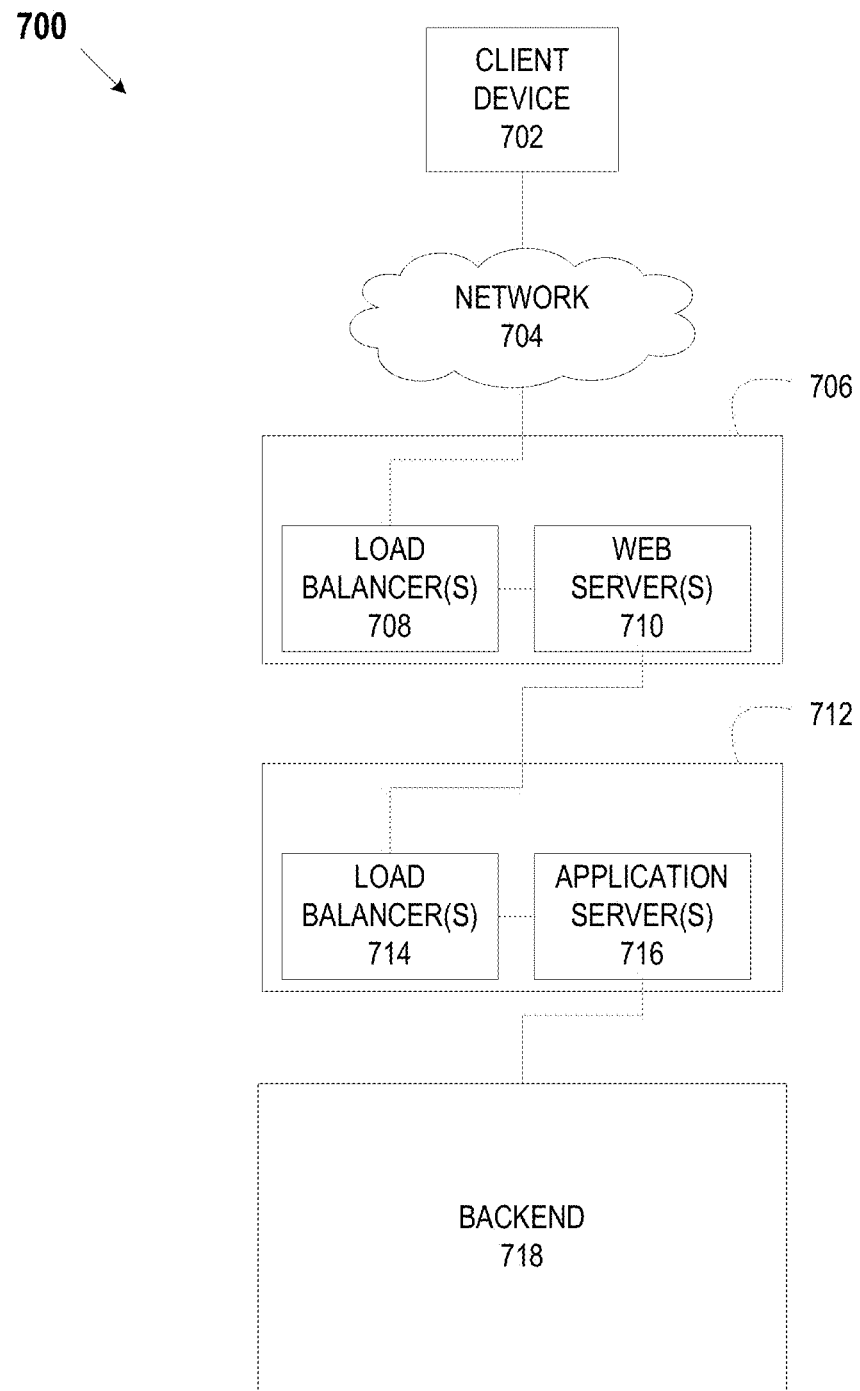
FIG. 7 depicts an example financial institution system according to an embodiment of the disclosure.

FIG. 7 depicts an example system 700 that may enable a financial institution, for example, to provide network services to its customers. As shown in FIG. 7, system 700 may include a client device 702, a network 704, a front-end controlled domain 706, a back-end controlled domain 712, and a backend 718. Front-end controlled domain 706 may include one or more load balancers 708 and one or more web servers 710. Back-end controlled domain 712 may include one or more load balancers 714 and one or more application servers 716.

Client device 702 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 700 may execute one or more software applications to enable, for example, network communications.

Client device 702 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 704 may be one or more of a wireless network, a wired network, or any combination of a wireless network and a wired network. For example, network 704 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 704 may include, without limitation, telephone lines, fiber optics, IEEE Ethernet 902.3, a wide area network (WAN), a local area network (LAN) or a global network such as the Internet. Also, network 704 may support an Internet network, a wireless communication network, a cellular network, or the like, or any combination thereof. Network 704 may further include one network, or any number of example types of networks mentioned above, operating as a stand-alone network or in cooperation with each other. Network 704 may utilize one or more protocols of one or more network elements to which they are communicatively couples. Network 704 may translate to or from other protocols to one or more protocols of network devices. Although network 704 is depicted as a single network, it should be appreciated that according to one or more embodiments, network 704 may comprise a plurality of interconnected networks, such as, for example, the Internet, a service provider's network, a cable television network, corporate networks, and home networks.

Front-end controlled domain 706 may be implemented to to provide security for backend 718. Load balancer(s) 708 may distribute workloads across multiple computing resources, such as, for example computers, a computer cluster, network links, central processing units or disk drives. In various embodiments, load balancer(s) 710 may distribute workloads across, for example, web server(S) 716 and/or backend 718 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 708 may include software that monitoring the port where external clients, such as, for example, client device 702, connect to access various services of a financial institution, for example. Load balancer(s) 708 may forward requests to one of the application servers 716 and/or backend 718 servers, which may then reply to load balancer 708. This may allow load balancer(s) 708 to reply to client device 702 without client device 702 ever knowing about the internal separation of functions. It also may prevent client devices from contacting backend servers directly, which may have security benefits by hiding the structure of the internal network and preventing attacks on backend 718 or unrelated services running on other ports, for example.

A variety of scheduling algorithms may be used by load balancer(s) 708 to determine which backend server to send a request to. Simple algorithms may include, for example, random choice or round robin. Load balancers 708 also may account for additional factors, such as a server's reported load, recent response times, up/down status (determined by a monitoring poll of some kind), number of active connections, geographic location, capabilities, or how much traffic it has recently been assigned.

Load balancers 708 may be implemented in hardware and/or software. Load balancer(s) 708 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 710 may include hardware (e.g., one or more computers) and/or software (e.g., one or more applications) that deliver web content that can be accessed by, for example a client device (e.g., client device 702) through a network (e.g., network 704), such as the Internet. In various examples, web servers, may deliver web pages, relating to, for example, online banking applications and the like, to clients (e.g., client device 702). Web server(s) 710 may use, for example, a hypertext transfer protocol (HTTP or sHTTP) to communicate with client device 702. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 710 may respond with the content of that resource or an error message if unable to do so. The resource may be, for example a file on stored on backend 718. Web server(s) 710 also may enable or facilitate receiving content from client device 702 so client device A02 may be able to, for example, submit web forms, including uploading of files.

Web server(s) also may support server-side scripting using, for example, Active Server Pages (ASP), PHP, or other scripting languages. Accordingly, the behavior of web server(s) 710 can be scripted in separate files, while the actual server software remains unchanged.

Load balancers 714 may be similar to load balancers 708 as described above.

Application server(s) 716 may include hardware and/or software that is dedicated to the efficient execution of procedures (e.g., programs, routines, scripts) for supporting its applied applications. Application server(s) 716 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 716 may act as a set of components accessible to, for example, a financial institution or other entity implementing system 700, through an API defined by the platform itself. For Web applications, these components may be performed in, for example, the same running environment as web server(s) 710, and application servers 716 may support the construction of dynamic pages. Application server(s) 716 also may implement services, such as, for example, clustering, fail-over, and load-balancing. In various embodiments, where application server(s) 716 are Java application servers, the web server(s) 716 may behaves like an extended virtual machine for running applications, transparently handling connections to databases associated with backend 718 on one side, and, connections to the Web client (e.g., client device 702) on the other.

Backend 718 may include hardware and/or software that enables the backend services of, for example, a financial institution or other entity that maintains a distributes system similar to system 700. For example, backend 718 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 718 may be associated with various databases, including account databases that maintain, for example, customer account information, product databases that maintain information about products and services available to customers, content databases that store content associated with, for example, a financial institution, and the like. Backend 718 also may be associated with one or more servers that enable the various services provided by system 700.

Figure 2:
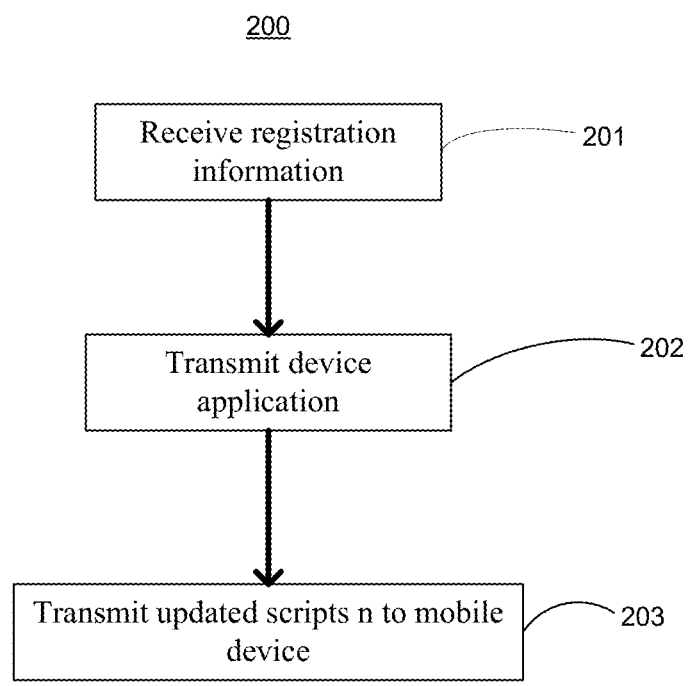
FIG. 2 depicts a schematic diagram of a method for providing a mobile device with a smart card management application, according to an exemplary embodiment of the disclosure.

Referring now to FIG. 2, FIG. 2 is a flow chart illustrating a method for providing card application 102*a* to mobile device 102. The method 200 shown in FIG. 2 can be executed or otherwise performed by one or more combinations of various systems. The method 200 as described below may be carried out by the system for providing read/write interfaces between a smart card and a mobile device by way of a secured application on the mobile device, as shown in FIGS. 1 and 5-7, by way of example, and various elements of that system are referenced in explaining the method of FIG. 2. Each block shown in FIG. 2 represents one or more processes, methods, or subroutines in the exemplary method 200. Referring to FIG. 2, the exemplary method 200 may begin at block 201.

In block 201, method 200 may include receiving registration information. The registration information may be received by issuer 104 from mobile device 102. The registration information may include a device identifier associated with the mobile device, such as a mobile phone number and/or a MAC address of the mobile device and/or the like. The registration information may include a username, password, social security number, email address, biometric information, or other information that uniquely identifies cardholder 106. Issuer 104 may store the registration information in one or more databases and associate it with cardholder 106 and mobile device 102. Cardholder 106 may provide the registration information to issuer 104 via payment network 101 and/or network 704. In response to receiving the registration information, issuer 104 may send one or more notifications, such as an email or text message, to mobile device 102, requesting verification information. The verification information may be an email containing a hyperlink to a verification page hosted by issuer 104. The cardholder 106 may click on the link and be directed to the verification page, which may complete the registration process, allowing mobile device 102 to download card application 102a. Verification via text messaging also may be used. Method 200 may proceed to block 202.

At block 202, method 200 may transmit a smart card management application to mobile device 102. The application may be transmitted by issuer 104, a financial institution, and/or the like. The application may be card application 102a. For example, the application may be a native mobile banking application, a mobile optimized web interface and/or the like. Cardholder 106 may download and install card application 102a on mobile device 102. Card application 102a may provide one or more graphical user interfaces allowing cardholder 106 to user mobile device 102 to exchange data with issuer 104 and/or smart card 103. Card application 102a may prompt cardholder 106 to enter an online PIN for smart card 103. The online PIN may have been previously created by issuer 104 and associated with smart card 103 and cardholder 106 in one or more databases. Issuer 104 may have provided the PIN over a secure channel, such as payment network 101, to mobile device 102. The online PIN may have been provided in an email or text message. Cardholder may use a keypad or touchscreen on mobile device 102 to enter the received online PIN or other unique password. Issuer 104 and/or financial institution may receive the entered online PIN and compare it to the online PIN associated with smart card 103 and cardholder 106. If the PINs match, issuer 104 may verify that mobile device 102 is a trusted device, and that card application 102a is enabled to perform management operations with smart card 103, for example, as will be described in connection with FIGS. 3 and 4. Method 200 may proceed to block 203.

In block 203, method 200 may transmit updated scripts to mobile device 102. Issuer 104 may transmit updated scripts to mobile device 102 using payment network 101. Issuer 104 may transmit updated scripts to mobile device 102 using, for example, cloud storage 105. Cardholder 106 may use mobile device 102 to check cloud storage 105 for updates. Also, cloud storage 105 may automatically "push" updated scripts to mobile device 102 as they are received from issuer 104. The scripts may be software modules that can be downloaded to mobile device 102 and later invoked by card application 102a to perform one or more functions involving smart card 103. Scripts may include an Update PIN script, which enables the card application 102a to update the offline PIN of smart card 103 and/or a provision card script, which may provision an account number to the card. Scripts may include loyalty programs, reward programs, deals, or other offers from issuer 104, merchant 107, or one or more third parties.

For example, a Rewards script may enable card application 102 to store rewards points on smart card 103. Smart card 103 may maintain a rewards points balance that cardholder 106 can use to buy goods or services.

Figure 3:
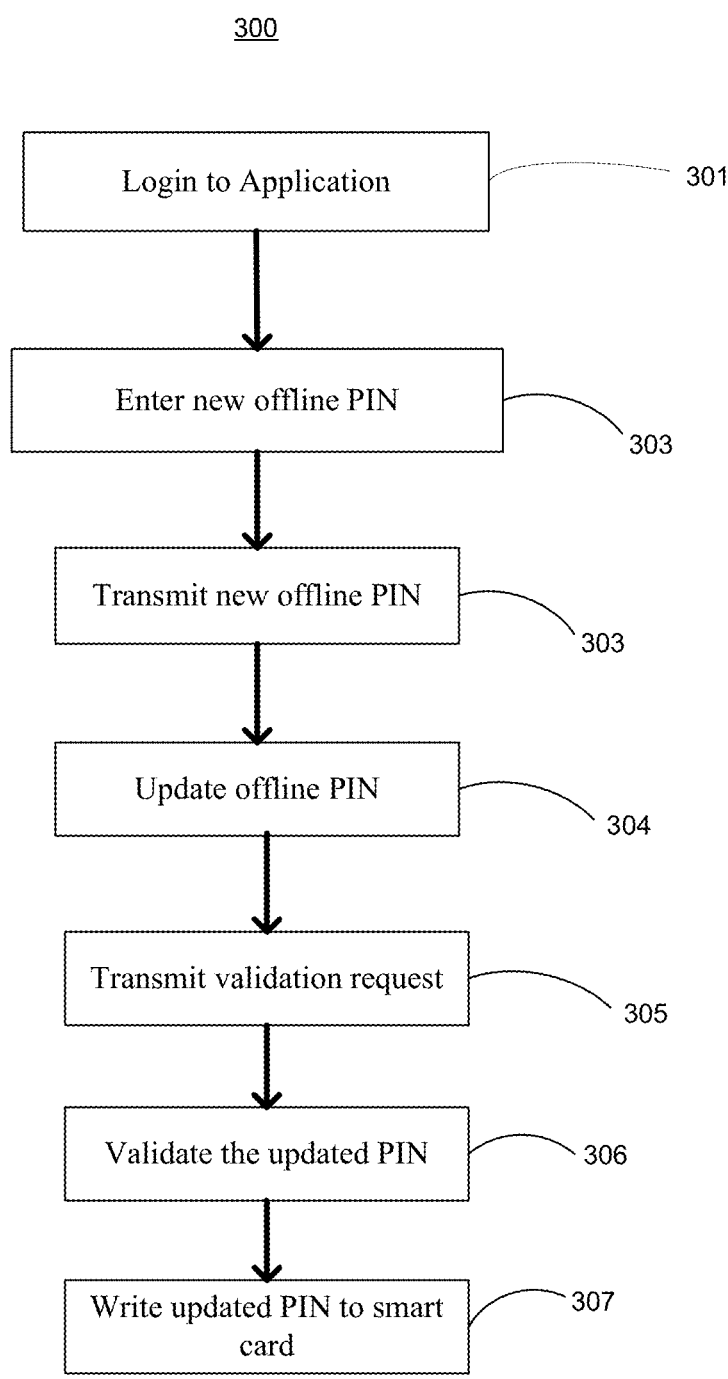
FIG. 3 depicts a schematic diagram of a method for updating the offline PIN on a smart card, according to an exemplary embodiment of the disclosure.

FIG. 3 is a flow chart illustrating a method updating the offline PIN on a smart card, for example, using a mobile application on a mobile device. The method 300 shown in FIG. 3 can be executed or otherwise performed by one or more combinations of various systems. The method 300 as described below may be carried out by the system for providing read/write interfaces between a smart card and a mobile device by way of a secured application on the mobile device, as shown in FIGS. 1 and 5-7, by way of example, and various elements of that system are referenced in explaining the method of FIG. 3. Each block shown in FIG. 3 represents one or more processes, methods, or subroutines in the exemplary method 300. Referring to FIG. 3, the exemplary method 300 may begin at block 301.

At block 301, cardholder 106 may login to card application 102a on mobile device 102. Cardholder 106 may provide a username and/or password and/or other similar login credentials to securely access card application 102a, using a touchscreen and/or keypad on mobile device 102. Cardholder 106 may provide biometric identification to mobile device 102. Cardholder may select one or more scripts on card application 102a, such as the Update PIN script. Method 300 may proceed to block 302.

At block 302, cardholder 106 may enter a new offline PIN for smart card 103 in response to a prompt from mobile device 102. The new PIN may be a series of letters or numbers chosen by cardholder 106. Cardholder 106 may enter the new offline PIN using a touchscreen or keypad associated with mobile device 102. Method 300 may proceed to block 303.

At block 303, card application 102a may "package" the new offline PIN and transmit the new offline PIN to issuer 104 or cloud storage 105. Cloud storage 105 may transmit the offline PIN to issuer 104 via payment network 101. Cloud storage 105 may transmit the new offline PIN to issuer 104 via a different network than payment network 101. Method 300 may proceed to block 304.

At block 304, Issuer 104 may update the previously stored offline PIN based on the new offline PIN. The previously stored offline PIN may be associated with cardholder 106 and smart card 103 in one or more databases associated with issuer 104. Issuer 104 may delete the previously stored offline PIN and replace it with the new offline PIN. Issuer 104 may sync the new offline PIN with the stored online PIN. Method 300 may proceed to block 305.

At block 305, Issuer 104 may transmit a validation request to mobile device 102. The validation request may be first transmitted to cloud storage 105, then pushed to mobile device 102. The validation request may be transmitted to mobile device 102 via payment network 101 via for example, an email message, text message, and or the like. Validation request may prompt the cardholder 106 to provide validation information. Method 300 may proceed to block 306.

At block 306, card application 102a may receive validation information from the cardholder 106. Card application 102a may prompt the cardholder 106 to validate the new offline PIN. Card application 102a may display the new offline PIN on the screen of mobile device 102 and request input from the cardholder 106 (such as a button, check box, or other interactive display that receives input from cardholder 106). Cardholder 106 may confirm the accuracy of the new offline PIN. Cardholder 106 may cancel the process or refuse to validate the new offline PIN. If cardholder 106 does not validate the new offline PIN, method 300 may end. In other embodiments, card application 102a may request confirmation from cardholder 106 that he wishes to keep his old offline PIN. Method 300 may proceed to block 307.

At block 307, if the offline PIN is validated, card application 102a may write the updated offline PIN to smart card 103. Card application 102a may prompt cardholder 106 to "tap" mobile device 102 to smart card 103. This may involve bringing smart card 103 in close physical proximity to mobile device 102 or physically touching smart card 103 with mobile device 102. Doing this may allow card application 102a to transmit the new offline PIN to smart card 103 using NFC 102c. The updated offline PIN also may be transmitted by having cardholder 106 dip smart card 103 towards card reader device 102b. Card application 102a may transmit one or more scripts that includes commands for smart card 103 to delete its current offline PIN and replace it with the new offline PIN in smart card 103's memory. Smartcard 103 may store the new offline PIN in response to receiving the one or more scripts or commands from card application 102a. In this way, a cardholder can use his mobile device to update the PIN on his smart card without having to find a smart card capable terminal or ATM.

Figure 4:
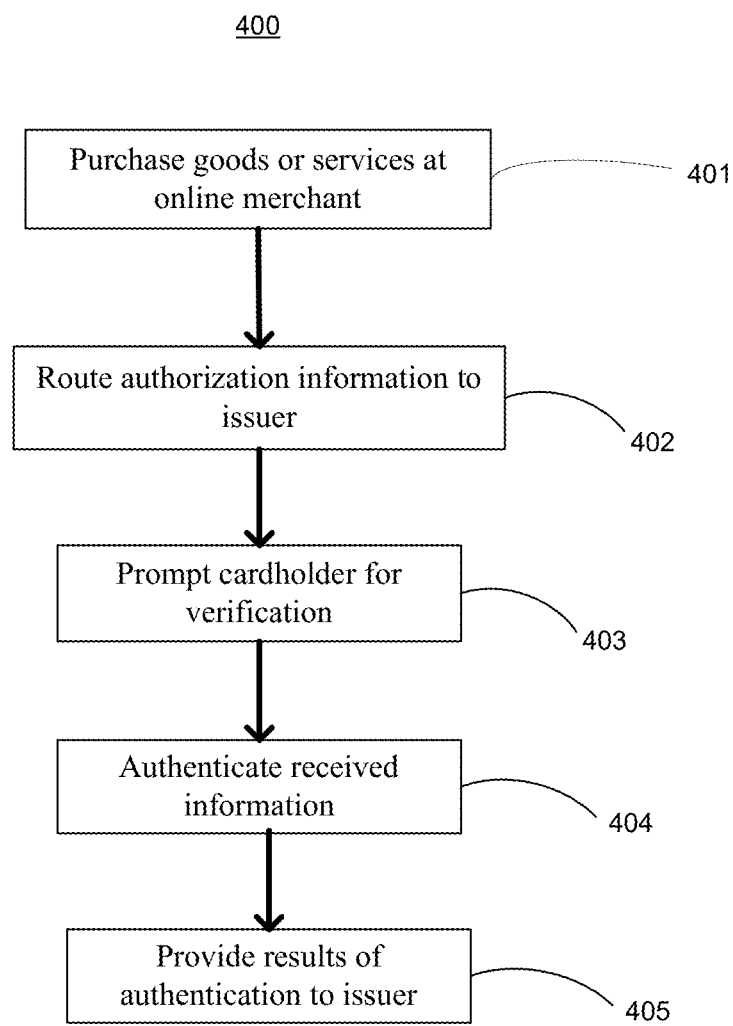
FIG. 4 depicts a schematic diagram of a method for authenticating a cardholder during an online transaction using smart card data, according to an exemplary embodiment of the disclosure

FIG. 4 is a flow chart illustrating a method for authenticating a cardholder to a merchant using data read from a smart card using a mobile device. The method 400 shown in FIG. 4 can be executed or otherwise performed by one or more combinations of various systems. The method 400 as described below may be carried out by the system for providing read/write interfaces between a smart card and a mobile device by way of a secured application on the mobile device, as shown in FIG. 1, by way of example, and various elements of that system are referenced in explaining the method of FIG. 4. Each block shown in FIG. 4 represents one or more processes, methods, or subroutines in the exemplary method 400. Referring to FIG. 4, the exemplary method 400 may begin at block 401.

At block 401, cardholder 106 may attempt to purchase one or more goods or services from merchant 107. Merchant 107 may be an online merchant. Cardholder 106 may access the merchant's website (such as a clothing website), select several dress shirts to purchase, place them in an online shopping cart, and proceed to checkout. At checkout, merchant 107 may prompt cardholder 106 for payment information. Cardholder 106 may provide one or more account numbers or card numbers associated with Smart card 103 in an attempt to purchase the shirts using smart card 103. Merchant 107 may receive this information and package it as authorization information. Method 400 may proceed to block 402.

At block 402, merchant 107 may route authorization information to issuer 104. The authorization information may include the account number associated with smart card 103 and/or cardholder 106. Merchant 107 may route the authorization information via payment network 101. In various embodiments, a merchant may route the authorization information in a manner as shown and described in, for example, FIG. 6. Referring back to FIG. 4, method 400 may proceed to block 403.

At block 403, issuer 104 may prompt cardholder 106 for verification. Issuer 104 may send one or more signals to mobile device 102. These signals may cause mobile device 102 to invoke card application 102a. Card application 102a may prompt cardholder 106 for the offline PIN for smart card 103. Card application 102a may cause one or more GUIs to be displayed on the screen of mobile device 102, and request that cardholder 106 enter his offline PIN using a keypad or touchscreen for mobile device 102. Method 400 may proceed to block 404.

At block 404, card application 102a may receive the cardholder's offline PIN and authenticate it with smart card 103. Cardholder 106 may enter his offline PIN on mobile device 102 in response to the prompt from card application 102a. Card application 102a may invoke one or more scripts, such as an Authenticate Cardholder script, to request the offline PIN stored on smart card 103. As with the Update PIN function described in connection with FIG. 3, invoking the Authenticate Cardholder script may cause card application 102a to prompt cardholder 106 to tap or touch smart card 103 to mobile device 102 in order that card application 102a may read and/or receive the offline PIN from smart card 103. The offline PIN on smart card 103 may be read using NFC 102c. In other embodiments, card application 102a may prompt cardholder 106 to dip smart card 103 towards cardreader device 102b and read the offline PIN on smart card 103.

Card application 102a may read the offline PIN stored on smart card 103 and compare it to the PIN entered by cardholder 106. In other embodiments, card application 102a may receive biometric data stored on smart card 103 and compare it to biometric data input by cardholder 106 (such as a fingerprint). Method 400 may proceed to block 405.

At block 405, mobile device 102 may transmit the results of the comparison to issuer 104. If the results indicate a match (for example, if the PIN entered by the cardholder on mobile device 102 matches the offline PIN stored on smart card 103), issuer 104 may send an authorization signal to merchant 107, authorizing the transaction to move forward. If the comparison indicates no match, or insufficient match, issuer 104 may send a signal to merchant 107, indicating the error, and prompting merchant 107 to request that cardholder 106 attempt to enter his PIN again. In other embodiments, merchant 107 may end the transaction. If issuer 104 authorizes the transaction, merchant 107 may proceed to checkout and allow the cardholder to pay for the purchased shirts. In this way, card application 102a may provide a way for a cardholder to use a smart card as a method of authentication when making online (non face-to-face or card not present) purchases. In various embodiments, blocks 403-405 may occur during in conjunction with the authorization methods described in FIGS. 4 and 6.

It is further noted that the software described herein maybe tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A non-transitory, computer-readable medium storing instructions that, when executed by a processor of a mobile device, cause the processor to perform a method comprising:
   transmitting, to an issuer system, registration information including user identification information and a device identifier associated with the mobile device;
   receiving, from the issuer system, a verification request;
   receiving, from a user, verification information;
   transmitting, to the issuer system, the verification information;
   downloading a mobile application;
   receiving, from the user via the mobile application, an online personal identification number (PIN);
   transmitting, to the issuer system, the received online PIN;
   receiving, from the issuer system, an indication that the processor is associated with a device that is a trusted device;
   receiving, from the user via the mobile application, a new offline PIN for a smart card;
   transmitting the new offline PIN from the mobile device and to the issuer system;
   requesting, from the user, confirmation that the new offline PIN is accurate;
   responsive to receiving, from the user, confirmation that the new offline PIN is accurate, transmitting the confirmed new offline PIN to the smart card; and
   transmitting instructions to the smart card, the instructions comprising a command to replace the previously stored PIN with the new offline PIN in a memory of the smart card.

2. The computer-readable medium of claim 1, wherein the mobile device is configured to communicate with the smart card via near-field communications (NFC).

3. The computer-readable medium of claim 1, further comprising the smart card, the smart card being an integrated circuit card.

4. The computer-readable medium of claim 1, further comprising the smart card, the smart card being a Europay, MasterCard and Visa card.

5. A method comprising:
   transmitting, from a mobile device and to an issuer system, registration information including user identification information and a device identifier associated with the mobile device;
   receiving, at the mobile device and from the issuer system, a verification request;
   receiving, at the mobile device and from a user, verification information;
   transmitting, from the mobile device and to the issuer system, the verification information;
   downloading, at the mobile device, a mobile application;
   receiving, from the user and at the mobile device via the mobile application, an online personal identification number (PIN);
   transmitting, to the issuer system and from the mobile device, the received online PIN:
   receiving, from the issuer system and at the mobile device, an indication that the mobile device is a trusted device;
   receiving, from the user and at the mobile device via the mobile application, a new offline PIN for a smart card;
   transmitting the new offline PIN from the mobile device and to the issuer system, the new offline PIN to be associated with the smart card and replace a previously stored PIN at the issuer system;
   requesting, at the mobile device and from the user, confirmation that the new offline PIN is accurate;
   receiving, from the user, confirmation that the new offline PIN is accurate, and transmitting the confirmed new offline PIN to the smart card; and
   transmitting instructions to the smart card, the instructions comprising a command to replace the previously stored PIN with the new offline PIN in a memory of the smart card.

6. The method of claim 5 further comprising:
   providing, by the mobile device, a first graphical user interface to pay for goods and services using the smart card;
   providing, by the mobile device, a second graphical user interface to change the offline PIN associated with the smart card; and
   providing, by the mobile device, a third graphical user interface to submit the online PIN or offline PIN to the smart card or the issuer system.

* * * * *